June 2, 1925.
R. SHUR
1,540,190
ANTISKID CHAIN
Filed Nov. 4, 1924
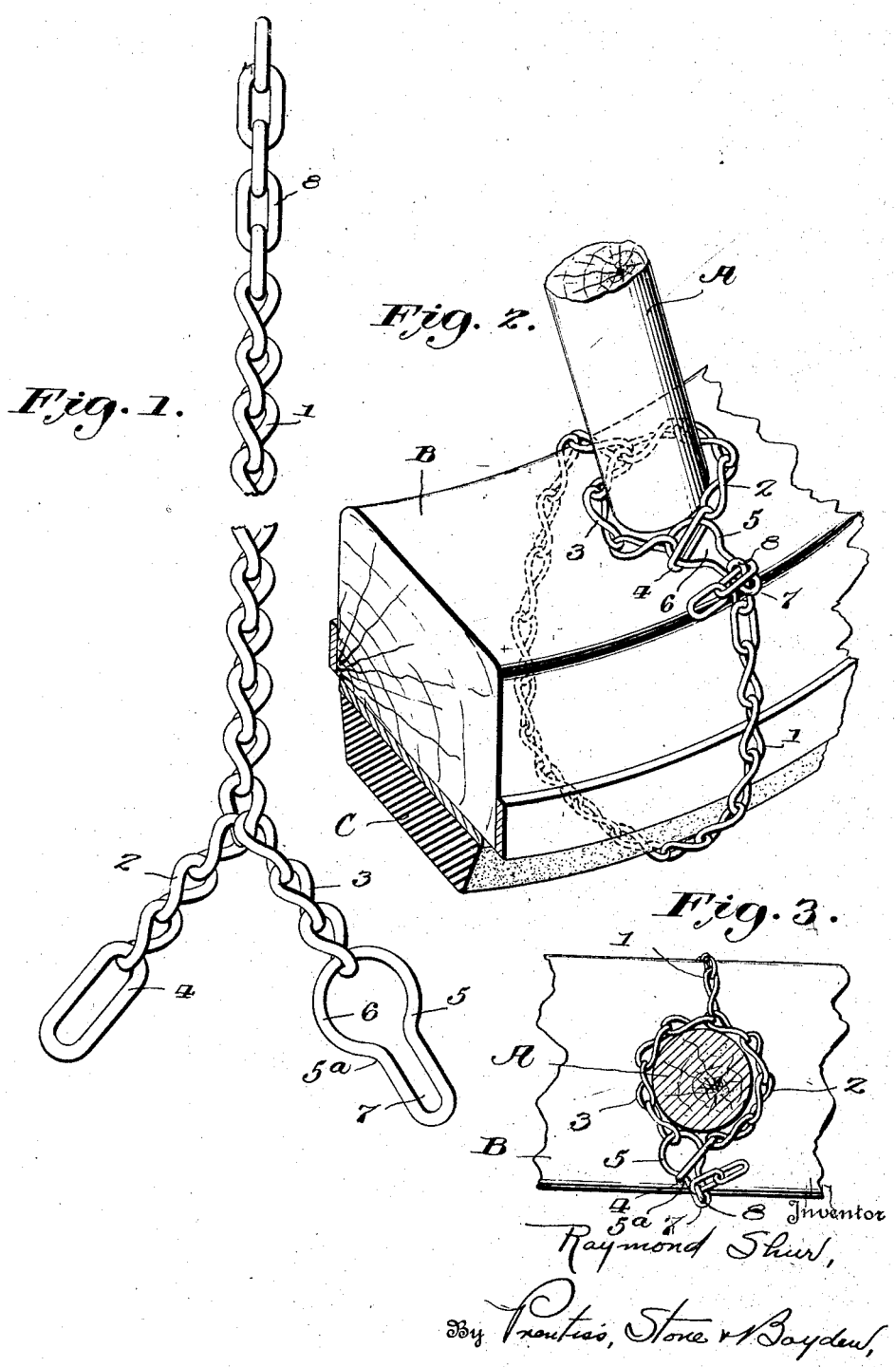

Patented June 2, 1925.

1,540,190

UNITED STATES PATENT OFFICE.

RAYMOND SHUR, OF LEMOYNE, PENNSYLVANIA.

ANTISKID CHAIN.

Application filed November 4, 1924. Serial No. 747,857.

*To all whom it may concern:*

Be it known that I, RAYMOND SHUR, a citizen of the United States, residing at Lemoyne, in the county of Cumberland and State of Pennsylvania, have invented certain new and useful Improvements in Antiskid Chains, of which the following is a specification.

This invention relates to anti-skid chains, and more particularly to unit chains of this character which are adapted to be applied to an automobile wheel at one or more points, when desired.

Numerous attempts have been made to provide a practicable unit chain of this character, but in many instances, such chains have been comparatively expensive to manufacture and have been provided with hooks, open links, or other complicated parts which are troublesome to manipulate.

The object of the present invention is to produce a unit chain of this type, which shall be cheap to manufacture, and which, while exceedingly simple in its construction, shall be capable of being securely and effectively applied to a wheel and quickly and easily detached.

In order that the invention may be readily understood, reference is had to the accompanying drawings, forming part of this specification, and in which:—

Figure 1 is a view of my improved chain unit complete, part being broken away;

Figure 2 is a perspective view showing the unit as it appears when applied to a wheel, and Figure 3 is a fragmentary view, showing a wheel spoke in section, and illustrating the position the chain links may sometimes assume.

Referring to the drawings in detail, my improved chain comprises a main body portion 1, preferably formed of twisted or curbed links of the type usually employed for anti-skid chains, said main body having extending from one end thereof, a pair of branches 2 and 3, as clearly shown in Figure 1. The main body of the chain is of sufficient length to surround a wheel felly B and tire C, as shown in Figure 2, while the branches 2 and 3 are of such length as to jointly encircle a spoke A. One of the branches, such as 2, carries at its end an elongated flat link 4, while the other branch 3 carries at its end a key-hole link 5, having a relatively large and preferably circular portion or bore 6, and a contracted or slotted portion 7, as clearly shown in Figure 1.

The opposite end of the body portion of the chain terminates in a series of straight flat links 8, of such size as to be capable of passing freely through the enlarged portion or bore 6 of the key-hole link, and each of the links 8 being so shaped as to be capable of slipping edgewise into the slot 7 of the key-hole link 5, so as to become locked therein by virtue of the engagement of adjacent links with the sides of the slot.

When it is desired to apply one of my improved unit chains to a wheel, the branches 2 and 3 are first placed around a spoke and the key-hole link is then inserted into and through the flat link 4, as clearly shown in Figure 2. The body of the chain is then placed around the felly and tire, and the free end thereof, comprising the flat links 8, is passed through the bore 6 of the key-hole link 7, adjacent the flat link 4. The chain is drawn through this bore until sufficient slack has been taken up, and then by moving it laterally, one of the links 8 is caused to enter the slot 7, and to become locked therein by means of adjacent links. The strain on the chain tends to force the locking links to the extreme end of the slot 7, and thus prevents disengagement thereof.

It will be understood that the flat link 4 is so narrow that the links of the branch chain 3 are unable to pass through it. By reference to Figure 2, therefore, it will be seen that the link of the branch chain to which the key-hole link 5 is attached, serves as a stop to limit the extent to which the key-hole link 5 may pass through the flat link 4. In fact, this stop results in arresting the key-hole link 5 in the position shown in Figure 2, so that when locked, this key-hole link lies within the flat link 4. The flat link thus serves to maintain the key-hole link in the proper position to receive the links 8 of the chain, and prevents twisting or angular displacement of the key-hole link. Moreover, preferably the slotted end of the key-hole link is so proportioned as to project substantially to or slightly beyond the edge of the average wheel rim, thus tending to hold the links 8 in position in the slot and to prevent accidental displacement thereof.

While in Figure 2 the key-hole link 5 is shown as passing through the flat link 4 until stopped by engagement of the adjacent chain link therewith, I find that in some cases, the links will assume the position illustrated in Figure 3. By reference to this figure, it will be seen that the link 4 extends across the middle of the key-hole link, adjacent the mouth of the slot, and with its end resting in the notch or depression 5ª at the junction of the large and contracted portions thereof. In this position, it will be observed that the flat link 4 tends to prevent inward movement and disengagement of the links 8 from the slot.

To remove the chain, as shown in Figure 2, all that is necessary is to slip the link 8 out of the slot 7 into the bore 6 of the key-hole link and the chain may then be freely withdrawn, whereupon the key-hole link itself slips out of the flat link 4. If the parts are in the position shown in Fig. 3, it may be necessary to push the link 4 back away from the slot, before the links 8 can be released.

It will be observed that there are no hooks or complicated parts of any nature whatever in connection with the invention, the construction being so simple that even accumulations of mud or the like will not interfere with its efficient operation.

What I claim is:—

1. A unit anti-skid chain comprising a main body and a pair of branches extending from one end of the body, said main body being long enough to surround a wheel felly and tire, and said branches being of such length as to jointly encircle a wheel spoke, one of said branches having at its end a key-hole-shaped link comprising a relatively large bore and a contracted portion or slot, and the other branch having at its end an elongated flat link through which the said keyhole link can pass, and the other end of the chain body comprising links capable of passing through the large portion or bore of the key-hole link, and constructed to engage and interlock with the slotted portion thereof.

2. A unit anti-skid chain comprising a main body and a pair of branches extending from one end of the body, said main body being long enough to surround a wheel felly and tire, and said branches being of such length as to jointly encircle a wheel spoke, one of said branches having at its end a key-hole shape link comprising a relatively large bore and a contracted portion or slot, and the other branch having at its end a flat link through which the said key-hole link, but not the branch-chain to which it is attached, can pass, whereby the adjacent branch-chain link acts as a stop to prevent the key-hole link from passing entirely through said flat link, and the other end of the chain body comprising links capable of passing through the bore of the key-hole link where it projects beyond the said flat link, and constructed to engage and interlock with the slotted portion of the key-hole link, to secure the chain in position.

3. A unit anti-skid chain comprising a body having at one end a pair of branches, one of said branches carrying at its end a key-hole link, and the other carrying a link through which said key-hole link may pass, and means for attaching the opposite end of the chain body to said key-hole link, whereby said single key-hole link constitutes a unitary fastening means for simultaneously securing the chain body around the wheel felly and the branches around a spoke.

4. A unit anti-skid chain comprising a main body and a pair of branches extending from one end of the body, said main body being long enough to surround a wheel felly and tire, and said branches being of such length as to jointly encircle a wheel spoke, one of said branches having at its end a key-hole shaped link comprising a relatively large bore and a contracted portion or slot, and the other branch having at its end an elongated flat link through which the said key-hole link can pass, and the other end of the chain body comprising links capable of passing through the large portion or bore of the key-hole link, and constructed to engage and interlock with the slotted portion thereof, the elongated flat link, when the chain is in operative position, extending across the key-hole link at a point adjacent the mouth of the slot, whereby said flat link tends to prevent accidental disengagement of the links of the chain body from such slot.

In testimony whereof I affix my signature.

RAYMOND SHUR.